April 28, 1936.  J. LEDWINKA  2,039,092
RAIL VEHICLE TIRE
Filed June 30, 1932
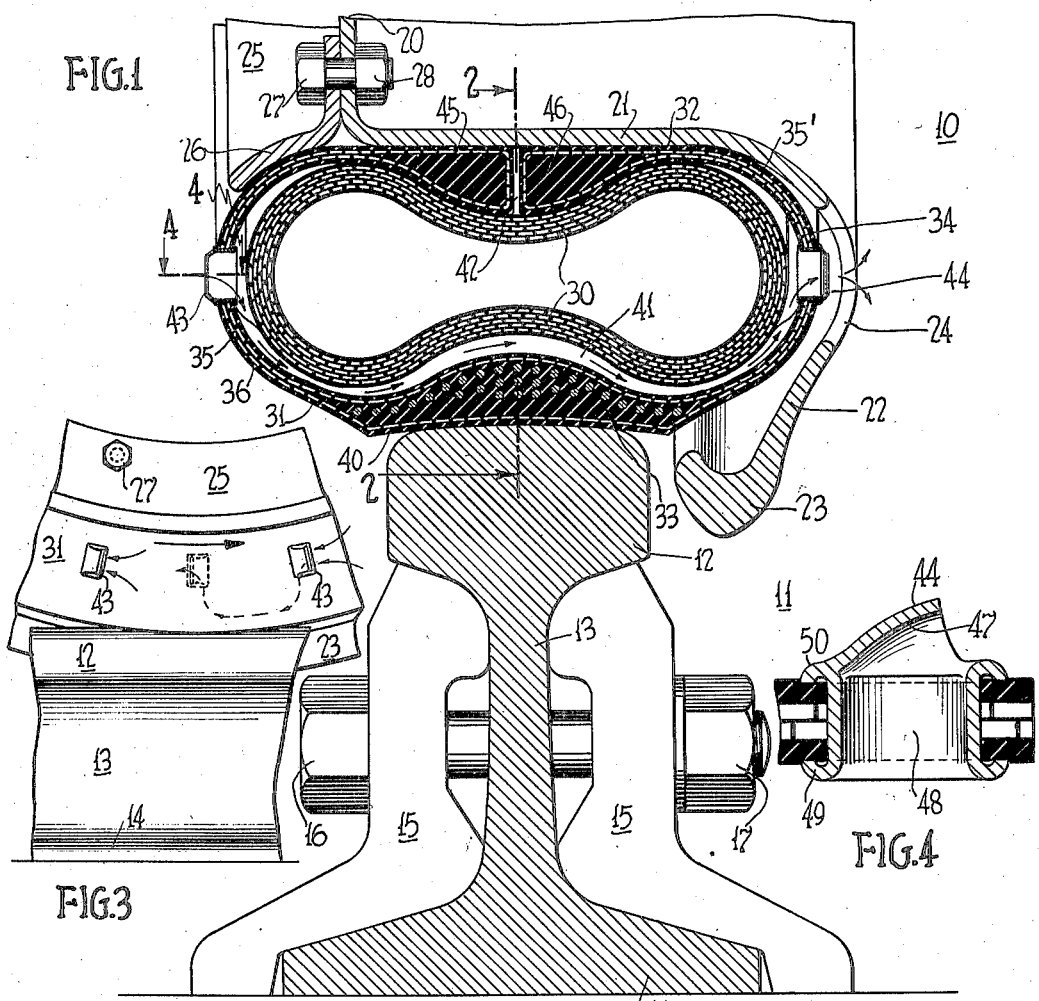
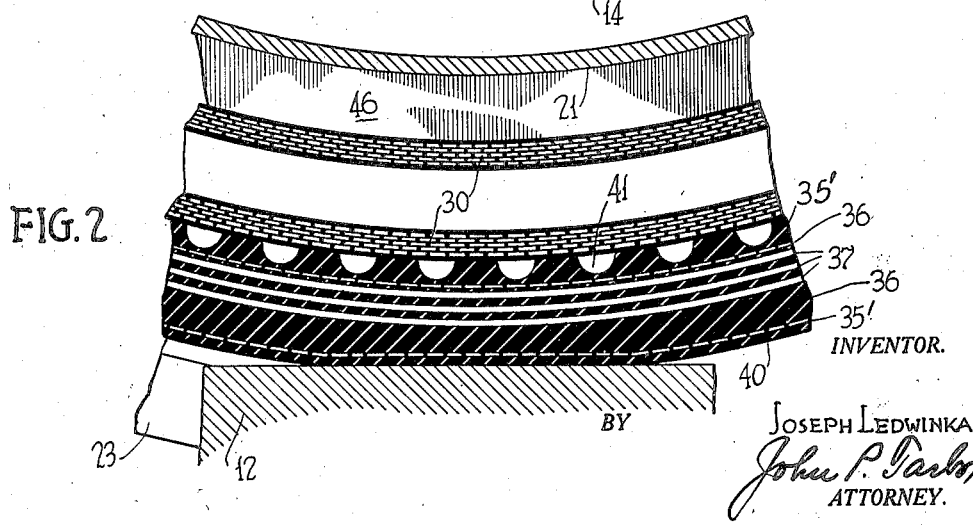
INVENTOR.
JOSEPH LEDWINKA.
John P. Taylor
ATTORNEY.

Patented Apr. 28, 1936

2,039,092

UNITED STATES PATENT OFFICE 2,039,092

RAIL VEHICLE TIRE

Joseph Ledwinka, Philadelphia, Pa., assignor to Edward G. Budd Manufacturing Company, Philadelphia, Pa., a corporation of Pennsylvania Application June 30, 1932, Serial No. 620,133

9 Claims. (Cl. 295—31)

This invention relates to vehicle wheels and more particularly to tires or tire-like members mounted upon the peripheral portions thereof and has for its principal object the construction of a wheel, well adapted for use upon vehicles arranged to run on rails.

In wheels of this general type a serious problem which is presented is that of maintaining the tires and tire parts at a safe operating temperature under all conditions of use.

Another paramount feature is that under all conditions of retained pressure and also during periods of deflation the vertical distance through which the axle will be lowered must be limited so that the retaining flange or rail engaging flange of the wheel will at no time strike rail accessories such as bolts, frogs, fish plates and the like, or allow the tire to drop to such an extent as to seriously affect the stability of the car as to its ability to stay upon the rails. Another feature is that a tire must be so constructed as to stand use under conditions of deflation, whereby it will be unnecessary for a short period after the deflation, to change a tire. The train schedules may thus be maintained and changing of tires under adverse conditions substantially eliminated.

I attain the above enumerated objects and others incidental thereto by constructing a tire and wheel assembly such that a circulation of air is maintained through the outer casing about the inner tube. Also the inner tube is made in such a manner as to be substantially inextensible, retaining its constructed formation under substantially all conditions of retained pressure and at the same time maintaining the outer casing upon the wheel periphery substantially without the need of securing means.

This invention will be better understood from the following description when diligently studied coordinately with the drawing hereto attached.

In the accompanying drawing,

Figure 1 shows an axial cross section through the wheel and rail,

Fig. 2 is a cross section on a medial plane of the tire substantially along the line 2—2 of Fig. 1, Fig. 3 is a partial elevation facing toward the rail engaging flange, and Fig. 4 is a section on the line 4—4 of Fig. 1 through the outer casing and one of the louvers.

In the accompanying drawing like ordinals represent corresponding parts in the various figures and the disclosure comprises essentially a wheel body 10 shown in section operatively disposed upon a rail 11. The rail structure is that normally encountered in railroad and railway members and consists of the rail 11 having a head 12, a web 13, flange 14, co-operating fish plates 15 and a bolt and nut 16 and 17 respectively, securing the parts together. The wheel 10 comprises a sheet metal body portion 20 having an axially extending tire seating portion 21 at the one extremity of which is the radially extending flange 22 having a rail engaging portion 23. Circumferentially spaced along a portion of the flange 22 substantially radially co-extensive with the tire are a plurality of openings 24 of suitable shape. At the opposite side of the wheel body from this rail engaging flange is an annular member 25 having a substantially arcuate axially extending portion 26. This member is susceptible of being secured to the wheel body 20 by means of bolt and nut members 27 and 28, which, by means of co-operating aligned openings in the two members retain them in substantially rigid association after mounting the tire. The parts so far described are essential to the mounting of a tire upon a vehicle and the operation of the vehicle upon a rail and inasmuch as they are susceptible of many modifications the structure just described is not to be taken as limiting the form, but numerous and sundry other forms may be used, the essential criterion being that the wheel structure be such as to allow the tire member to be mounted thereupon and secured thereto without interfering with the functioning of the tire members per se.

The tire is composed of essentially two casings, an inner casing 30 and an outer casing 31. The inner casing 30 is made of materials as to be substantially inextensible after inflation and to retain under all conditions of retained pressure operation a cross section substantially as shown. This may be described as a figure 8 or link or some other type of cross section, any term satisfactorily describing the same being suitable. The casing is of substantially uniform thickness throughout the radially inner and outer walls as are also the end walls.

The outer casing 31 comprises radial inner and outer walls 32 and 33 of appreciable radial depth and centrally thereof arranged for co-operation under conditions of deflation and also end walls 34 and 35 of substantially uniform thickness connecting the inner and outer walls. This outer casing may be constructed with a fabric portion 35' of any suitable configuration and of any suitable number of plys commensurate with the stresses of the structure. Vulcanized or secured by any other process generally customary with tires, to this fabric, is a body of rubber 36 of varying depth or thickness in different parts of the casing. However, in this case it is substantially co-extensive of the interior and exterior surfaces of the casing substantially throughout. The outer radial wall of the tire adapted to bear upon the rail head in operation comprises a tread surface 40 radially inwardly of which is an annularly extending body of rubber of appreciable radial depth having substantially enlarged cross section. Interiorly of this large body of rubber beneath the tread are mounted a plurality of annularly extending members 37 of suitable form and material so as to maintain the outer tread of the tire under all conditions of retained pressure in substantially cylindrical form.

The radial inner wall of the outer casing is split substantially in the medial plane of the wheel as at 42 thus making the enlarged portion of the inner walls substantially triangular in cross section having opposed bases in juxtaposition along the center line. The side walls of the casing have a plurality of spaced louvers 43 and 44 oppositely facing. These louvers during the rotation of the wheel body pick up a body of cool air adjacent the wheel at one side and allow it, by means of a plurality of communicating passages 41 interiorly of the casing and connecting the two louvers, to pass around the inner casing and thence outwardly of the tire at the opposite side through the other louvers. These louvers may be directly opposite at the sides of the tire or may be alternately spaced so that the passage of the air through the tire is necessarily diagonal. This particular feature is susceptible of various forms, the controlling factor being that the air is picked up on one side and passes through the tire and out the other side. This may be accomplished by a simulated pumping action due to the construction of the parts. In this manner the cooling effect of the tire parts is very greatly increased. The passages 41 interconnecting the two louvers internally of the tire comprise a plurality of transverse slots or grooves 41.

The inner casing when housed interiorly of the outer casing because of its substantially inextensible construction takes the configuration shown and does not block up the louvers because the inwardly extending annular beads of the radially inner and outer walls maintain the central portion substantially arcuate as shown, and the retained fluid pressure maintains the side walls in substantially semi-spherical section. This is so designed as to space the inner casing from the side walls of the outer casing thereby allowing for maintaining free passage of the air from one side of the tire to the other through the interior passages 41. The inner casing under conditions of retained pressure also maintains the inner beads 45 and 46 in their central position between the radially enlarged portions oppositely transverse of the central plane of the wheel.

The louvers 43 and 44 may be of a simple type, as shown in enlarged section of Fig. 4, comprising outer fin portions 47 adapted to scoop up the air and a central cylindrical portion 48 which passes through the side walls of the tire having the reversely turned substantially cylindrical flanges 49 and 50 which retain the member in the tire section.

The tire constructed embodies a number of novel features, and I aim to cover by the appended claims all modifications within the true spirit and scope of the invention.

What I claim is:

1. A tire comprising plural casings, the outer of which comprising a radial inner wall centrally split and having central interiorly extending enlarged portions, and the inner of said casings comprising a substantially inextensible tubular member arranged to maintain the outer casing inflated and to retain said enlarged portions in juxtaposed relation under inflation pressure, the side walls of the outer casing being free to flex throughout.

2. A tire comprising a substantially inextensible inner casing having smooth walls of uniform thickness and an outer casing having oppositely extending ventilating openings in its side walls and passages between said inner casing and outer casing permitting free passage of air between the ventilating openings on the opposite side walls.

3. A tire comprising a casing having complementary radial outer and centrally split inner walls, the outer of which having a tread surface and radially inwardly thereof a transverse section of substantial radial depth having an inward arcuate surface, means in said wall to predeterminately limit the effective diameter of the casing, transverse channels upon said inward arcuate surface, openings in the side walls of said tire alternately oppositely disposed, and an inexpansible preformed removable inner casing of substantially figure 8 section interiorly disposed in said tire.

4. A tire comprising a substantially inextensible inner casing having smooth walls of uniform thickness and an outer casing having ventilating openings in its side walls, the inner casing being spaced from the side walls of the outer casing in the regions of said openings, and passages between the walls of the inner and outer casings on the tread wall thereof interconnecting said spaces.

5. A pneumatic tire comprising an inextensible inner casing and an outer casing spaced therefrom having openings in the side walls arranged on either side oppositely facing in the direction of movement to direct the passage of air into the space between said casings at one side and out of said space at the opposite side.

6. An inextensible inner casing for vehicle tires of substantially uniform thickness throughout having in transverse section bulbous side portions and a restricted central portion of a depth very substantially less than the width of said bulbous side portions.

7. In a vehicle wheel the combination with a rim, of a split tire casing having an inwardly enlarged central portion adjacent the split and a substantially inextensible inner casing adapted under inflation pressure to cooperate with said enlargement to hold the split casing in position.

8. In a vehicle tire having complementary enlarged portions in its radial inner and outer walls the combination of side walls having ventilating openings therein formed of louvers facing oppositely as to the direction of rotation of said tire.

9. In a tire for a rail wheel including a rail engaging flange, a removable substantially inextensible inner casing and an outer casing enveloping the inner casing and comprising a radially outer wall of substantially flat form and a radially inner radially split wall, the latter wall being centrally of substantially thickened cross section and arranged to bring the central portions of the inner faces of said combined casings in such adjacency as to preclude, under conditions of deflation, track accessory engagement by the flange of the wheel upon which the tire is adapted to be used.

JOSEPH LEDWINKA.